United States Patent [19]

Bialkowski

[11] 4,262,688

[45] Apr. 21, 1981

[54] METAL SEAT ASSEMBLIES FOR VALVES

[75] Inventor: Ludwik S. Bialkowski, Troy, Ohio

[73] Assignee: ACF Industries, Incorporated, New York, N.Y.

[21] Appl. No.: 42,394

[22] Filed: May 25, 1979

[51] Int. Cl.³ .................. F16K 51/00; F16K 25/00; F16K 5/00; F16J 15/38

[52] U.S. Cl. .................. 137/242; 251/160; 251/315; 277/65; 251/180; 251/192; 251/174

[58] Field of Search .............. 251/159, 160, 174, 180, 251/192, 172, 315; 137/242, 242.3; 277/58, 59, 65

[56] References Cited

U.S. PATENT DOCUMENTS

| | | | |
|---|---|---|---|
| 2,290,783 | 7/1942 | Turpin | 137/242 |
| 3,181,834 | 5/1965 | Jennings et al. | 251/174 |
| 3,252,684 | 5/1966 | Ksieski | 251/315 |
| 3,761,099 | 9/1973 | Hansson | 277/65 |
| 3,940,107 | 2/1976 | Allenbaugh, Jr. | 251/315 |
| 4,071,220 | 1/1978 | Iino | 251/315 |
| 4,073,473 | 2/1978 | Rihm et al. | 251/172 |
| 4,124,194 | 10/1978 | Alvarez et al. | 251/159 |
| 4,137,936 | 2/1979 | Sekimoto et al. | 251/174 |

*Primary Examiner*—Martin P. Schwadron
*Assistant Examiner*—A. Michael Chambers
*Attorney, Agent, or Firm*—Eugene N. Riddle; Stephen T. Belsheim

[57] ABSTRACT

A metal seat assembly (40) for sealing against the sealing surface of a valve member movable between open and closed positions. The seat assembly comprises an outer metallic ring (44) having an inwardly extending metal seal lip (58) hinged to the main body (48) of the ring by a reduced thickness portion. An intermediate metal backing ring (45) has a plurality of spaced fingers engaging the hinged metal lip to urge continuously the lip (58) into tight sealing contact with the valve member, and the backing ring may be adjusted to control the force exerted by the fingers against the metal lip. An innermost metal wiper ring (46) adjacent the flexible metal lip is urged continuously into contact with the sealing surface of the valve member to minimize contact of foreign matter with the sealing lip.

9 Claims, 7 Drawing Figures

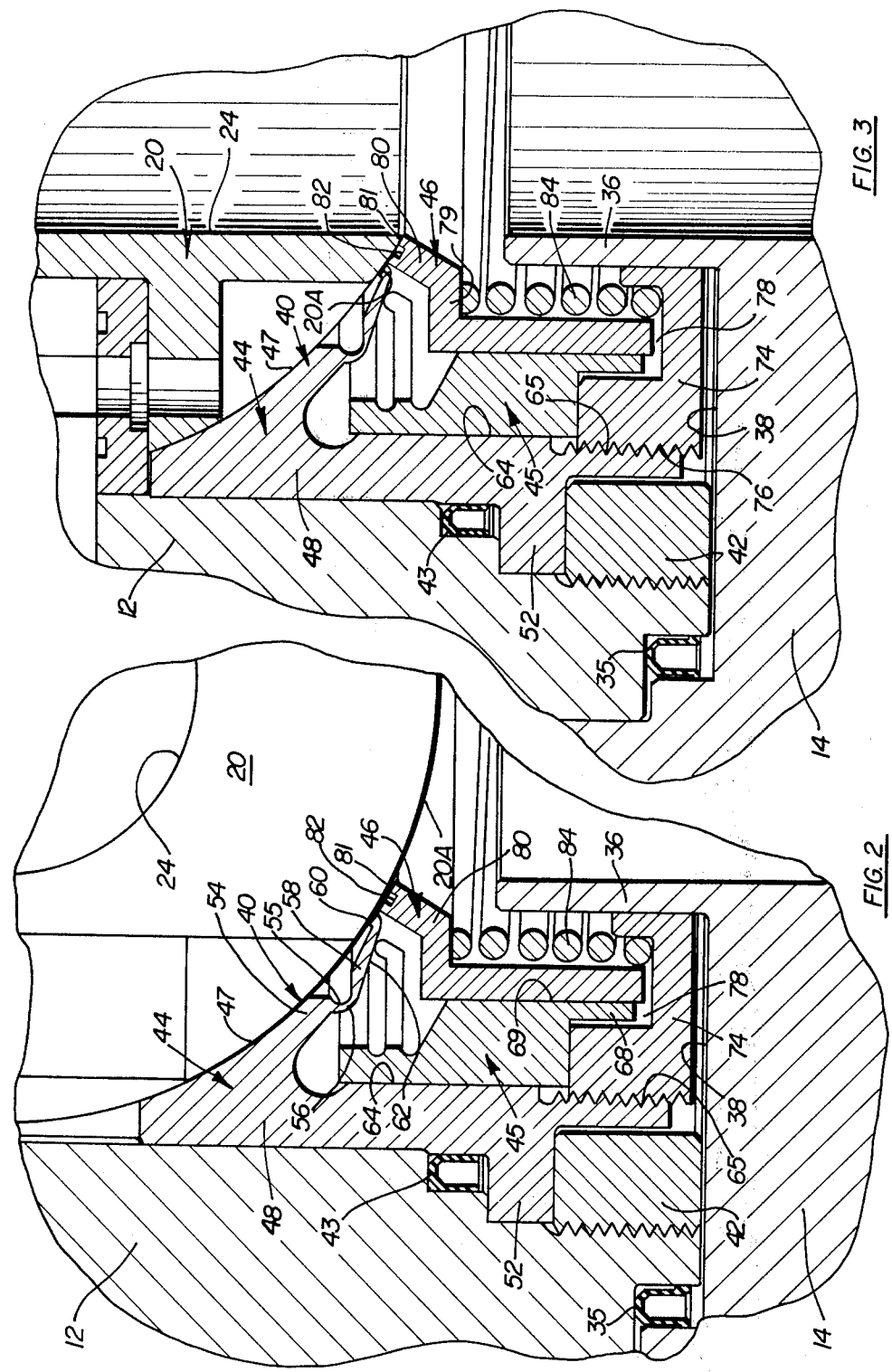

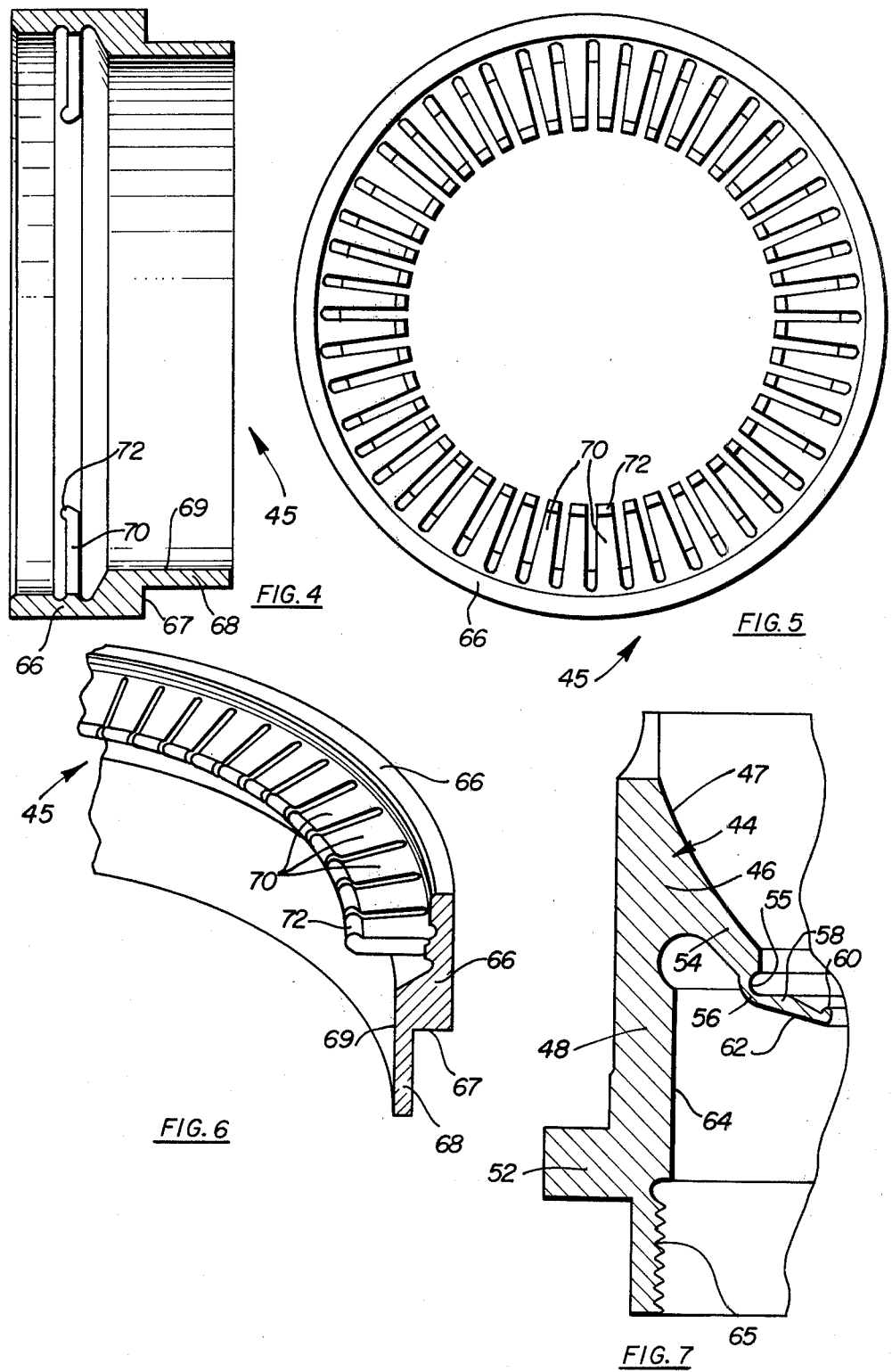

METAL SEAT ASSEMBLIES FOR VALVES

BACKGROUND OF THE INVENTION

Metal seat assemblies employing metal seals are particularly desirable for high temperatures and high pressures. Usually a valve is subjected to a high temperature environment as it is transporting a lading at a relatively high temperature which is considered to be any temperature above around 300° F. It is desirable that the metal seals be sufficiently flexible to maintain a fluid-tight seal with a movable valve member when the valve member is in a high temperature service.

Metal seals have been employed heretofore for high temperature service in ball valves such as shown in U.S. Pat. No. 4,071,220 dated Jan. 31, 1978. This patent shows a metal seat having an inner annular groove to provide a flexible sealing lip with a metal spring in the groove to urge the metal sealing lip into engagement with the adjacent sealing surface of the movable valve member. Copending application Ser. No. 877,592 filed Feb. 13, 1978 entitled "Metal Gate Valve Having a Flexible Front Lip Face Seal" shows a metal seat member for a gate valve in which a flexible front lip face seal is provided by a flexible lip having an annular groove behind the lip so that the lip can deform to compensate for deformation of the valve body for maintaining sealing contact with the gate member as the valve is in the open and closed positions. This metal seat is particularly adaptable for high temperatures and high pressures.

BRIEF DESCRIPTION OF THE INVENTION

A metal seat assembly for a valve which includes a metal seal face lip to engage in sealing relation the adjacent sealing surface of the movable valve member. The seat assembly has an outer metal ring with an inwardly extending hinged metal face lip. A separate metal backing ring in concentric relation to the outer ring has a plurality of spaced fingers or tines engaging the hinged metal lip about its entire circumference to urge continuously the metal lip into tight sealing contact with the valve member. The backing ring may be adjusted relative to the outer ring to control the force exerted by the fingers against the metal lip. A separate inner wiper ring in concentric relation to the outer ring and the backing ring is spring urged into engagement with the valve member to act as a wiper along the sealing surface of the valve member to protect the metal sealing lip from foreign matter and the like.

An object of this invention is to provide a metal seat assembly having a flexible metal sealing lip to engage the surface of the movable valve member, the lip being urged into sealing engagement by a force which may be controlled and is transmitted to the lip at a plurality of locations spaced about the circumference of the metal lip.

FIG. 2 is an enlarged sectional view of the metal seat assembly shown in FIG. 1 with the ball valve member in a closed position;

FIG. 3 is an enlarged sectional view of the metal seat assembly similar to FIG. 2 but showing the ball valve member in an open position;

FIG. 4 is an enlarged section of the backing ring for urging the metal lip into sealing engagement with the valve member;

FIG. 5 is a top plan of the backing ring shown in FIG. 4;

FIG. 6 is a perspective of a portion of the backing ring of FIGS. 4 and 5; and

FIG. 7 is an enlarged section of the outer ring of the seat assembly.

Figure 1:
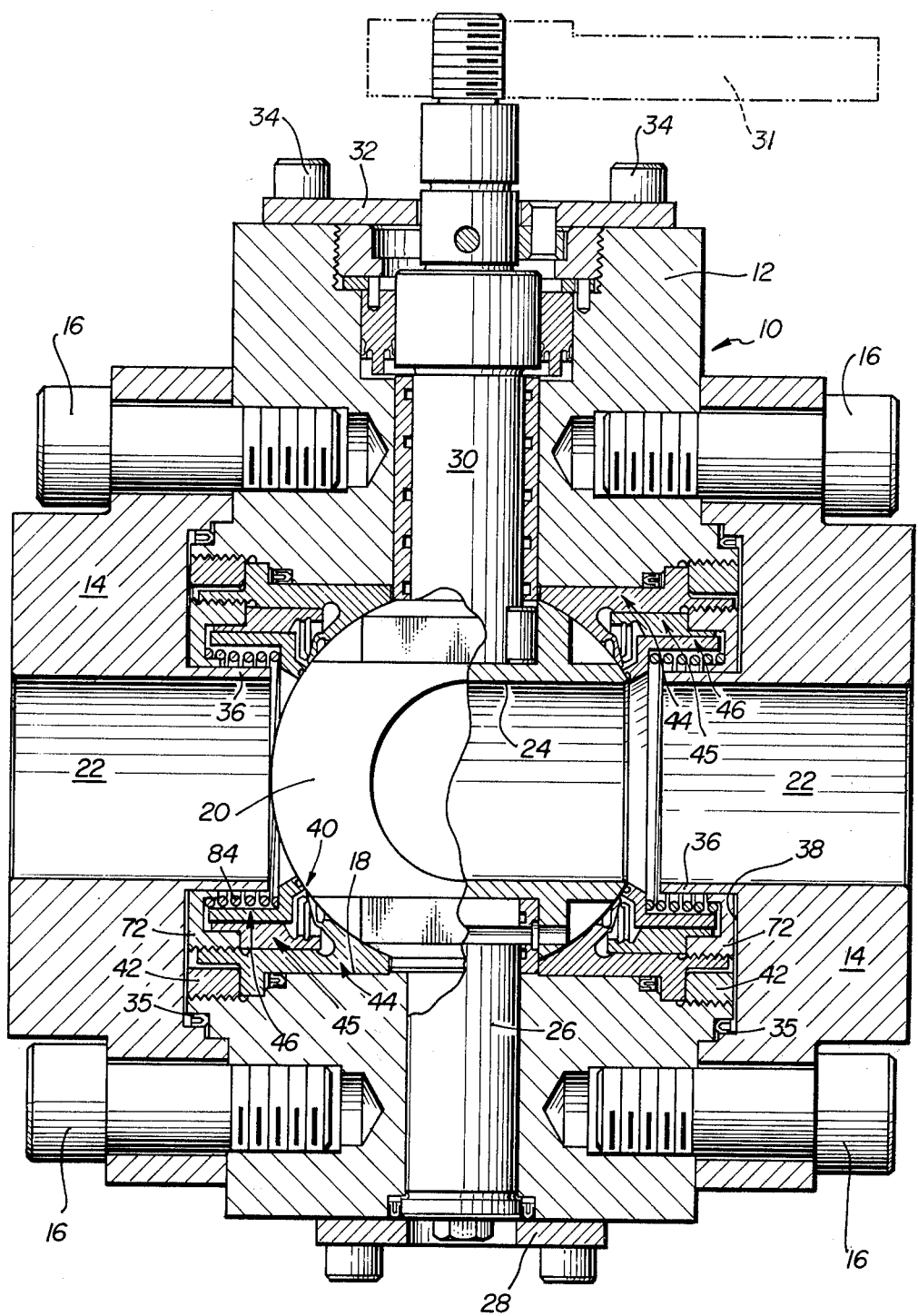
FIG. 1 is a cross-sectional view of a ball valve structure in which the metal seat assembly of the present invention is employed, a portion of the movable ball member being broken away and shown in section.

Referring to the drawings for a better understanding of this invention, and more particularly to FIG. 1, the ball valve structure is generally indicated at 10 including a main body 12 and end body connections 14 which are secured by bolts 16 to main body 12. Main body 12 has a valve cavity or chamber at 18 and a ball valve member 20 is mounted in valve chamber 18 for rotative movement between open and closed positions relative to flow passages 22 in end connections 14. Ball valve member 20 has a bore 24 therein adapted to align with flow passages 22 in the open position thereof.

A lower stem 26 is secured to ball valve member 20 and a lower cover plate 28 holds lower stem 26 in position. An upper stem 30 is keyed to ball valve member 20 and has an upper end extending from valve body 12 adapted to receive a handle 31 thereon for manual rotation of ball valve member 20 between open and closed positions. An upper cover plate 32 secured by bolts 34 to the body 12 holds upper stem 30 in position. A generally V-shaped metal seal 35 is provided between each end connection 14 and body 12.

Each end connection 14 has an inwardly extending tubular extension 36 defining a shoulder 38. A pocket is formed between shoulder 38 and body 12 to receive a seat assembly generally indicated at 40 which forms an important part of this invention. The upstream and downstream seat assemblies 40 are identical and a retainer ring 42 is threaded on body 12 to hold the associated seat assembly 40 in position. A generally V-shaped metal seal 43 is provided between seat assembly 40 and body 12.

Each seat assembly 40 comprises an outer seal ring 44, an intermediate backing ring 45, and an inner wiper ring 46, all arranged in concentric relation. Seal ring 44 as shown particularly in FIG. 7 has a main body 48 with an inner arcuate surface 47 which is adapted to be disposed against the outer sealing surface 20A of ball valve member 20. Main body 48 of seat ring 46 has an outer annular extension 52 and retainer ring 42 abuts extension 52 to hold extension 52 against body 12 for retaining seat assembly 40. A cantilevered arm 54 extending inwardly from body 48 has an annular groove 55 therein which forms a reduced thickness portion or hinge 56 to provide a highly flexible lip 58 having an inner sealing tip or surface 60 which forms a metal face seal adapted to engage in sealing relation the adjacent sealing surface 20A of ball valve member 20. Lip 58 has a back or rear surface 62 opposite front sealing surface 60. Inner periphery 64 of ring 44 is threaded at 65 and intermediate backing or support ring 45 is mounted adjacent periphery 64 for adjustable movement relative to sealing ring 44. As shown in FIGS. 4-6, support ring 45 has a generally cylindrical main body 66 defining an abutment 67 and a reduced diameter portion 68 having an inner periphery 69. Body 66 has a plurality of spaced fingers 70 extending from the inner circumference thereof with the inner end of each finger 70 being directed inwardly at 72 for engaging back surface 62 of flexible lip 58 to urge sealing surface 60 into tight sealing relation with the adjacent sealing surface 20A of ball valve member 20.

An adjusting retaining ring is shown at 74 and has outer screw threads 76 in engagement with screw threads 65 on sealing ring 44. Adjustment of ring 74 varies the positioning of fingers 70 against lip 58 thereby to adjust the sealing force against sealing face tips 60. Adjusting ring 74 forms a pocket 78 and fits between extension 36 and sealing ring 44 as shown particularly in FIGS. 2 and 3. Inner wiper ring 46 is mounted adjacent the inner circumference 69 of backing ring 45 and is generally angle-shaped forming an inner leg 79 that is angled at end portion 80 in a direction generally perpendicularly toward ball valve member 20. End portion 80 has a face surface 81 with a groove 82 thereon which is adapted to receive foreign matter and the like from the adjacent sealing surface 20A of ball valve member 20. Wiper ring 46 is preferably formed of a plastic material such as tetrafluoroethylene. A coil spring 84 is biased between inner retainer 74 and arm 79 to continuously urge wiper ring 46 into sealing engagement with adjacent sealing surface 20A. The wiper surface 81 is in engagement with sealing surface 20A directly adjacent lip 58 and restricts foreign matter and the like from coming into contact with sealing tip 60.

Thus, an improved sealing assembly is provided by the utilization of a highly flexible hinged lip 58 which is urged into sealing engagement with a movable valve member 20 by a plurality of spring fingers 70 which contact lip 58 at a plurality of spaced areas or tips 60 about the entire circumference of the lip 58. Intermediate backing ring 45 may be adjusted to vary the spring force against lip 58.

What is claimed is:

1. In a valve including a valve body having a valve chamber and a flow passage communicating with the valve chamber, and a valve member mounted in said valve chamber for movement between open and closed positions relative to the flow passage; an improved seat assembly about said flow passage adjacent the valve member, said seat assembly comprising:
    an outer metal ring having an inwardly extending flexible metal lip for engaging in sealing relation the adjacent sealing surface of the valve member;
    an intermediate concentric support ring havng cantilevered spring fingers engaging the flexible metal lip to urge the lip into sealing engagement with the valve member;
    an inner concentric wiper ring positioned adjacent said support ring and adapted to contact said sealing surface of the valve member closely adjacent the flexible lip to act as a wiper along the sealing surface of the valve member, and a spring urging the wiper ring into contact with the sealing surface of the valve member.

2. In a valve as set forth in claim 1, wherein an annular hinge formed of a reduced thickness connects said flexible metal lip and permits hinged movement of said lip.

3. In a valve as set forth in claim 1, wherein the sealing face of said resilient ring has an annular notch therein to receive foreign matter.

4. In a valve as set forth in claim 1, wherein a separate intermediate ring is positioned between said inner resilient ring and said outer metal ring and has cantilevered spring fingers engaging said metal lip to urge continuously the flexible lip into sealing engagement with the valve member.

5. A valve as set forth in claim 1 further comprising:
    an adjustable retainer connected to said outer metal ring for longitudinal movement relative thereto, and a spring positioned between said retainer and said resilient ring for urging said resilient ring into engagement with said valve member, whereby the force at which said resilient ring contacts said valve member can be adjusted by movement of said retainer.

6. A valve as set forth in claim 1 further comprising:
    an adjustable retainer connected to said outer metal ring for longitudinal movement relative thereto, said support ring continuously abuts said retainer so that the force with which said fingers urge said lip into sealing contact with said valve member in selectively determinable.

7. A valve as set forth in claim 1 further comprising:
    an adjustable retainer connected to said outer metal ring for longitudinal movement relative thereto, and a spring positioned between said retainer and said resilient ring for urging said resilient ring into engagement with said valve member, whereby the force at which said resilient ring contacts said valve member can be adjusted by movement of said retainer, and said support ring continuously abuts said retainer so that the force with which said fingers urge said lip into sealing contact with said valve member is selectively determinable.

8. In a valve including a valve body having a valve chamber and a flow passage communicating with the valve chamber, and a valve member mounted in said valve chamber for movement between open and closed positions relative to the flow passages; an improved seat assembly about said flow passage adjacent the valve member, said seat assembly comprising:
    an outer metal ring having an inwardly extending flexible metal lip about its inner periphery, said flexible lip having a front face for engaging the adjacent sealing surface of the valve member and an opposed rear face;
    an inner concentric support ring having a plurality of inwardly extending support fingers spaced arcuately about the inner circumference of the support ring and contacting the rear face of the flexible lip for urging the flexible lip into sealing contact with the valve member; and
    an adjustable retainer threadedly connected to said outer metal ring for longitudinal movement relative to said metal ring, said support ring continuously abuts said retainer so that the force with which said fingers urge said lip into sealing contact with the valve member is selectively determinable by movement of the adjustable retainer.

9. In a valve as set forth in claim 1, wherein an inner resilient ring concentric to said support ring and said outer ring is positioned adjacent said support ring and is adapted to contact the sealing surface of the valve member closely adjacent said flexible lip to act as a wiper along the sealing surface of the valve member.

* * * * *